(12) United States Patent
Kichline, Jr. et al.

(10) Patent No.: US 6,921,013 B1
(45) Date of Patent: Jul. 26, 2005

(54) METHOD AND APPARATUS FOR PERFORMING A MAGNETIC PULSE WELDING OPERATION

(75) Inventors: John L. Kichline, Jr., Reading, PA (US); Jason A. Poirier, Sinking Spring, PA (US)

(73) Assignee: Dana Corporation, Toledo, OH (US)

( * ) Notice: Subject to any disclaimer, the term of this patent is extended or adjusted under 35 U.S.C. 154(b) by 122 days.

(21) Appl. No.: 10/407,804

(22) Filed: Apr. 4, 2003

Related U.S. Application Data

(60) Provisional application No. 60/369,979, filed on Apr. 4, 2002.

(51) Int. Cl.[7] ............................................. B23K 20/00
(52) U.S. Cl. ...................................... 228/115; 228/3.1
(58) Field of Search ................................. 228/115, 3.1

(56) References Cited

U.S. PATENT DOCUMENTS

| | | | |
|---|---|---|---|
| 4,571,807 A | | 2/1986 | Hines et al. |
| 5,981,921 A | | 11/1999 | Yablochnikov |
| 5,983,478 A | | 11/1999 | Dolan et al. |
| 6,255,631 B1 | * | 7/2001 | Kichline et al. ............ 219/617 |
| 6,630,649 B1 | * | 10/2003 | Gafri et al. ................. 219/603 |
| 2003/0127453 A1 | * | 7/2003 | Kichline, Jr. ............... 219/617 |
| 2004/0174014 A1 | * | 9/2004 | Storage et al. ............. 285/21.1 |

FOREIGN PATENT DOCUMENTS

WO        WO 99/65636     * 12/1999

* cited by examiner

*Primary Examiner*—Kiley S. Stoner
(74) *Attorney, Agent, or Firm*—MacMillan, Sobanski & Todd, LLC (57) ABSTRACT

A pair of metallic components are co-axially aligned prior to full energization of the magnetic pulse welding inductor to provide for improved control of the magnetic pulse welding process. To accomplish this, either or both of the components are supported in a floating manner. An electromagnetic coil is then energized so as to generate a magnetic field of relatively small intensity within or about one of the components. This relatively small intensity magnetic field exerts a relatively small force on the two components, causing them to move to a co-axially aligned position relative to one another and to the coil. Then, while the components are co-axially aligned, they are subjected to a magnetic field of relatively large intensity for the purpose of permanently joining such components together. This relatively large intensity magnetic field exerts a large pressure on one of the two components, causing it to deform toward the other of the two components at a high velocity. The high velocity impact of these two components, as well as the large pressures exerted thereon, caused the two components to become permanently joined together.

32 Claims, 7 Drawing Sheets

METHOD AND APPARATUS FOR PERFORMING A MAGNETIC PULSE WELDING OPERATION

CROSS REFERENCE TO RELATED APPLICATION

This application claims the benefit of U.S. Provisional Application No. 60/369,979, filed Apr. 4, 2002, the disclosure of which is incorporated herein by reference.

BACKGROUND OF THE INVENTION

This invention relates in general to magnetic pulse welding techniques for permanently joining two metallic components, such as a pair of structural components for a vehicle frame assembly. In particular, this invention relates to an improved method and apparatus for performing a magnetic pulse welding operation that automatically and co-axially aligns the two components relative to one another and to a magnetic pulse welding inductor prior to full energization of the inductor for improved control of the magnetic pulse welding process.

Magnetic pulse welding is a well known process that can be used to permanently join two metallic components, such as a pair of structural components of a vehicle frame assembly. Typically, a magnetic pulse welding operation is performed by initially disposing the first and second components in an axially overlapping relationship. When so disposed, a portion of the first component axially overlaps a portion of the second component. An electromagnetic inductor is provided for generating an intense magnetic field within or about the axially overlapping portions of the first and second components. When this occurs, a large pressure is exerted on one of the first and second components, causing it to move toward the other of the first and second components at a high velocity. If the electromagnetic coil is disposed about the exterior of the two components, then the outer component is deformed inwardly into engagement with the inner component. If, on the other hand, the electromagnetic coil is disposed within the interior of the two components, then the inner component is deformed outwardly into engagement with the outer component. In either event, the high velocity impact of the first and second components, as well as the large pressures exerted thereon, cause the two components to become permanently joined together.

In order to insure that the two components are properly joined in this manner, it is important that they be co-axially aligned prior to energization of the electromagnetic coil. This is done to insure that a uniform annular gap is provided between the two components when they are subjected to the intense magnetic field. If a non-uniform gap is provided between the two components when they are subjected to the intense magnetic field, the some portions thereof may not achieve the necessary high velocity impact that is necessary to cause permanent joining of the two components. Traditionally, such co-axial alignment has been accomplished by mechanical fixtures that physically engage the two components and support them in the desired manner. However, such fixtures have been found to be relatively difficult to set up and maintain, particularly when the two components are relatively large or heavy. Thus, it would be desirable to provide an improved method and apparatus that automatically and co-axially aligns two components prior to full energization of the magnetic pulse welding inductor to provide for improved control of the magnetic pulse welding process.

SUMMARY OF THE INVENTION

This invention relates to an improved method and apparatus that automatically and co-axially aligns two components, such as a pair of metallic structural components of a vehicle frame assembly, prior to full energization of the magnetic pulse welding inductor to provide for improved control of the magnetic pulse welding process. To accomplish this, either or both of the components are supported in a floating manner, i.e., a manner in which either or both of such components are free to move relative to one another, at least to a limited extent. An electromagnetic coil is then partially energized so as to generate a magnetic field of relatively small intensity within or about one of the components. This relatively small intensity magnetic field exerts a relatively small force on the two components, causing them to move to a co-axially aligned position relative to one another and to the coil. Then, while the components are co-axially aligned, they are subjected to a magnetic field of relatively large intensity for the purpose of permanently joining such components together. This relatively large intensity magnetic field exerts a large pressure on one of the two components, causing it to deform toward the other of the two components at a high velocity. The high velocity impact of these two components, as well as the large pressures exerted thereon, caused the two components to become permanently joined together. If desired, the preliminary low intensity magnetic field can also be used to preliminarily heat the two components in the nature of induction heating. This can be accomplished by maintaining the preliminary low intensity magnetic field for a predetermined period of time beyond that which is necessary to effect the co-axial alignment of the components. Such preliminary heating of the two components can soften them somewhat in order to facilitate the subsequent performance of the magnetic pulse welding operation. As a result of such softening, the amount of energy that is consumed during the magnetic pulse welding operation may be reduced.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
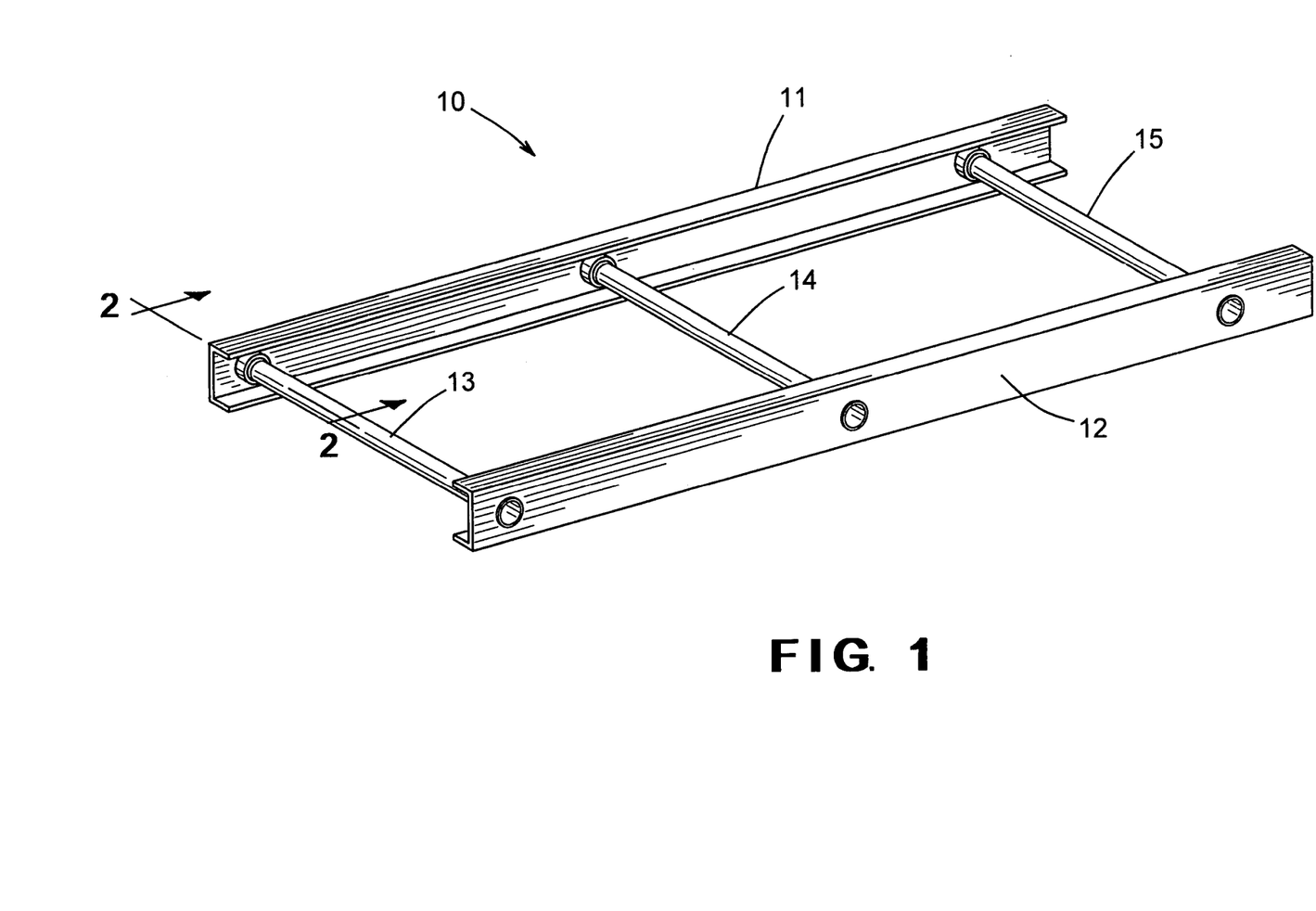
FIG. 1 is a schematic perspective view of a vehicle body and frame assembly including a pair of side rails having a plurality of cross members secured thereto in accordance with the method of this invention.

Referring now to the drawings, there is schematically illustrated in FIG. 1 a first embodiment of a vehicle body and frame assembly, indicated generally at 10, that has been manufactured in accordance with the apparatus and method of this invention. The illustrated vehicle body and frame assembly 10 is a ladder frame assembly. However, it will be appreciated that the apparatus and method of this embodiment of the invention may be utilized in the manufacture of any type of vehicle body and frame assembly, such as a unitized body and frame assembly where the structural components of the body portion and the frame portion are combined into an integral unit, as discussed above. Furthermore, although this invention will be described in the context of the illustrated vehicle body and frame assembly 10, it will be appreciated that this invention can be used to secure any type of metallic components together.

The illustrated ladder frame assembly 10 includes a pair of longitudinally extending side rails, indicated generally at 11 and 12, having a plurality of transverse cross members, indicated generally at 13, 14, and 15, extending therebetween. The side rails 11 and 12 extend longitudinally along the length of the assembly 10 and are generally parallel to one another. Each of the illustrated side rails 11 and 12 is formed from a single, unitary member that extends along the entire length of the assembly 10. However, it will be appreciated that the side rails 11 and 12 may extend for only a portion of the length of the frame assembly 10. Alternatively, either or both of the side rails 11 and 12 may be formed from two or more individual side rail sections that are welded or secured together in any manner to form the side rails 11 and 12. The illustrated side rails 11 and 12 are formed from open channel structural members having a cross sectional shape that is generally C-shaped. However, the side rails 11 and 12 may be formed having any desired cross sectional shape. Furthermore, the side rails 11 and 12 may be formed from closed channel structural members having any desired cross sectional shape. The side rails 11 and 12 may be formed from any desired material or group of materials.

The cross members 13, 14, and 15 extend generally perpendicular to the side rails 11 and 12. The cross members 13, 14, and 15 are spaced apart from one another along the length of the assembly 10. The ends of the cross members 13, 14, and 15 are secured to the side rails 11 and 12 at respective joints in a manner that will be described in detail below. When secured to the side rails 11 and 12, the cross members 13, 14, and 15 provide desired rigidity to the assembly 10. Although three cross members 13, 14, and 15 are shown in FIG. 1, it will be appreciated that a greater or lesser number of such cross members 13, 14, and 15 may be provided is desired. The illustrated cross members 13, 14, and 15 are formed from closed channel structural members having a generally circular cross sectional shape. However, the cross members 13, 14, and 15 may be formed having any desired cross sectional shape and may, if desired, be from open channel structural members.

Figure 2:
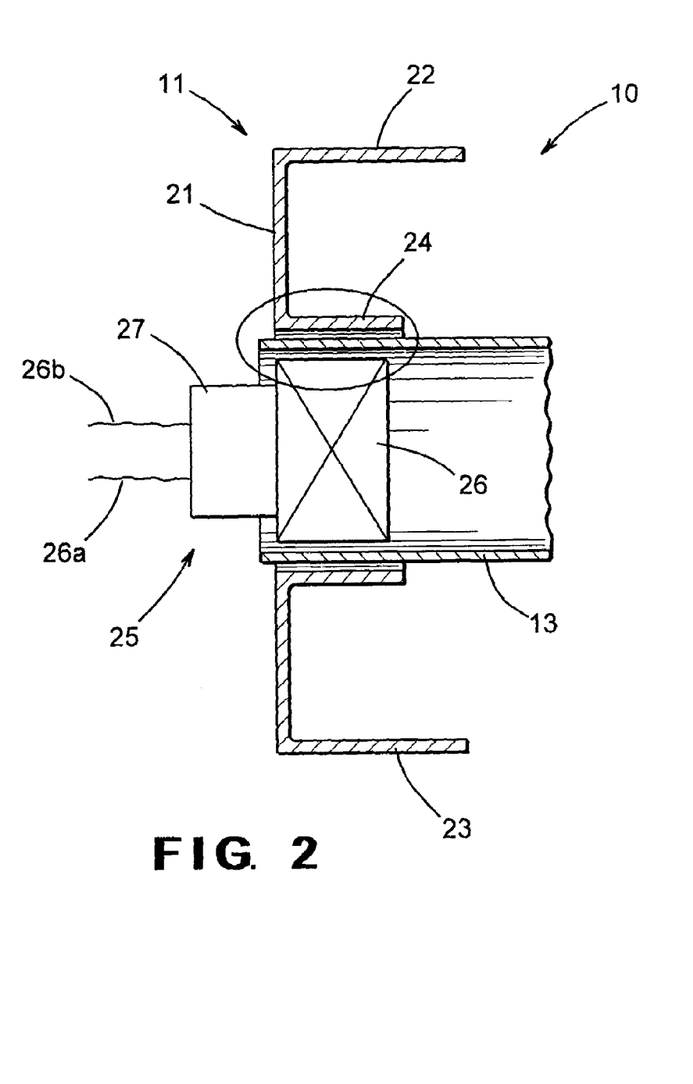
FIG. 2 is an enlarged sectional elevational view of portions of one of the side rails and one of the cross members taken along line 2—2 of FIG. 1 shown prior to being secured together.

Referring now to FIG. 2, there is illustrated an enlarged sectional elevational view of portions of the two side rails 11 and 12 and one of the cross members 13 of the ladder frame assembly 10. The side rail 11 includes a central web 21 having upper and lower flanges 22 and 23 extending therefrom. A portion of the web 21 is deformed inwardly to provide an opening defining a cross member mounting projection, indicated generally at 24. In the illustrated embodiment, the mounting projection 24 is generally cylindrical in shape, corresponding to the generally cylindrical shape of the end of the cross member 13. However, it will be appreciated that the mounting projection 24 and the end of the cross member 13 may be formed having any desired shapes. The other side rail 12 can be formed in a similar manner, although such is not required. As will be explained in greater detail below, the mounting projections 24 are sized to receive respective ends of the cross member 13 therein to form a joint between the cross member 13 and each of the side rails 11 and 12.

An internal magnetic pulse welding inductor assembly, indicated generally at 25, is provided to connect the end of the cross member 13 to the mounting projection 24 of the side rail 11. The magnetic pulse welding inductor assembly 25 is generally conventional in the art and includes an electromagnetic coil 26 that is carried on a movable support 27. The coil 26 is composed of a winding of an electrical conductor having leads 26a and 26b that extend therefrom through a switch (not shown) to a source of electrical power (not shown). In a manner that is known in the art, when the switch is closed, a closed electrical circuit is formed through the leads 26a and 26b between the source of electrical power and the coil 26. As a result, electrical current flows through the coil 26, causing a magnetic field to be generated thereabout. In the past, the closing of the switch caused a magnetic field of relatively large intensity to be generated within the end of the cross member 13. This relatively large intensity magnetic field exerted a large pressure on the end of the cross member 13, causing it to expand outwardly toward the mounting projection 24 of the side rail 11 at a high velocity. The high velocity impact of these two components, as well as the large pressures exerted thereon, caused the two components to become permanently joined together.

Figure 3:
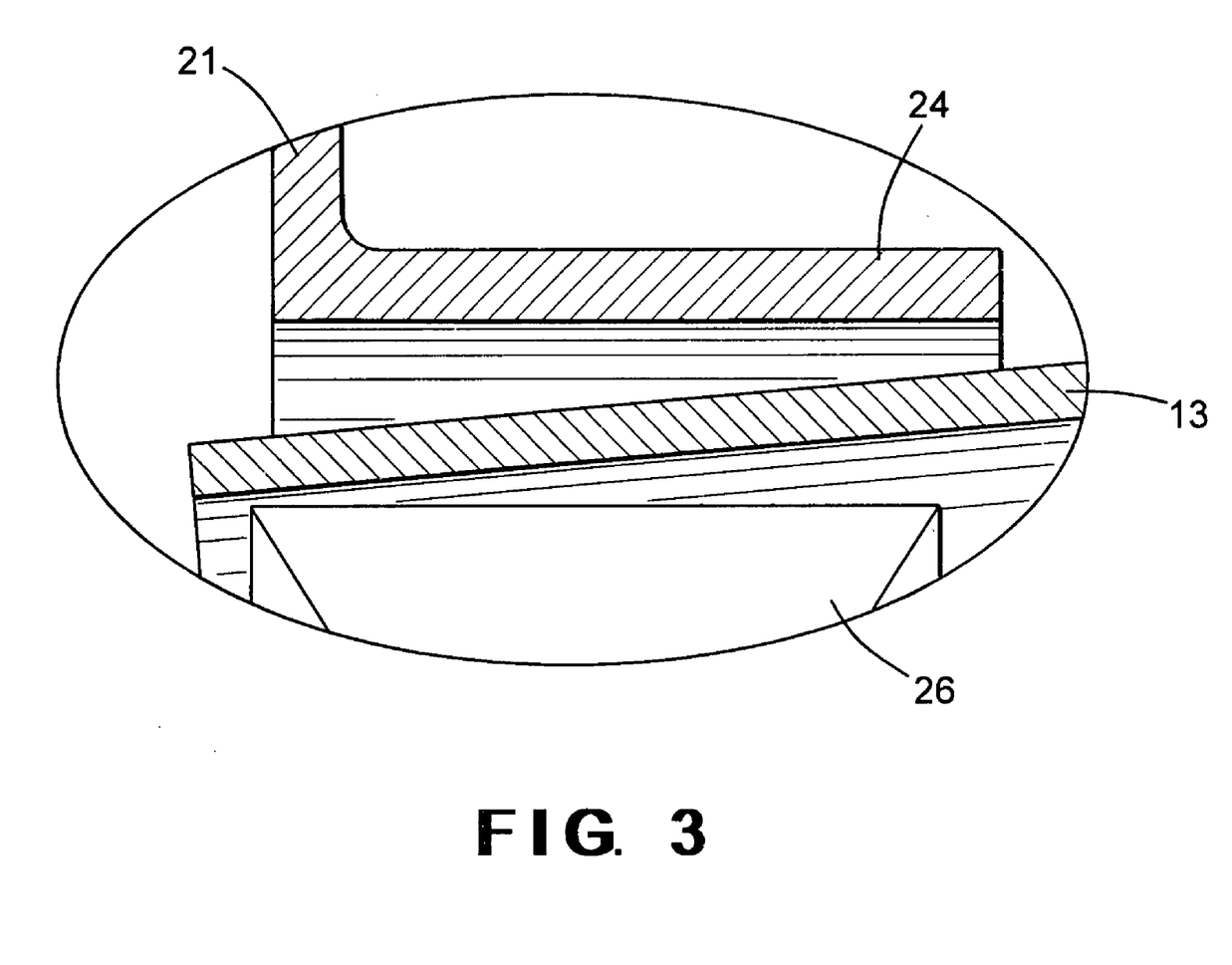
FIG. 3 is a further enlarged sectional elevational view of portions of one of the side rails and one of the cross members illustrated in FIG. 2 illustrating, in a somewhat exaggerated manner, the two members in a preliminary misaligned condition.

As discussed above, in order to insure that the end of the cross member 13 and the mounting projection 24 of the side rail 11 are properly joined in this manner, it is important that they be co-axially aligned prior to full energization of the electromagnetic coil. This is done to insure that a uniform annular gap is provided between the two components when they are subjected to the intense magnetic field. However, as best shown in FIG. 3, the end of the cross member 13 and the mounting projection 24 of the side rail 11 may be initially axially misaligned, which can yield undesirable results.

To address this, this invention contemplates that the two components be preliminarily subjected to a magnetic field of relatively small intensity for the purpose of causing such components to become co-axially aligned before they are subjected to the above-described magnetic field of relatively large intensity for the purpose of permanently joining such components together. To accomplish this, either or both of the components are supported in a floating manner, i.e., a manner in which either or both of such components are free to move relative to one another, at least to a limited extent. Thus, the end of the cross member 13 and the mounting projection 24 of the side rail 11 are initially free to assume a misaligned position, such as shown in FIG. 3.

Figure 4:
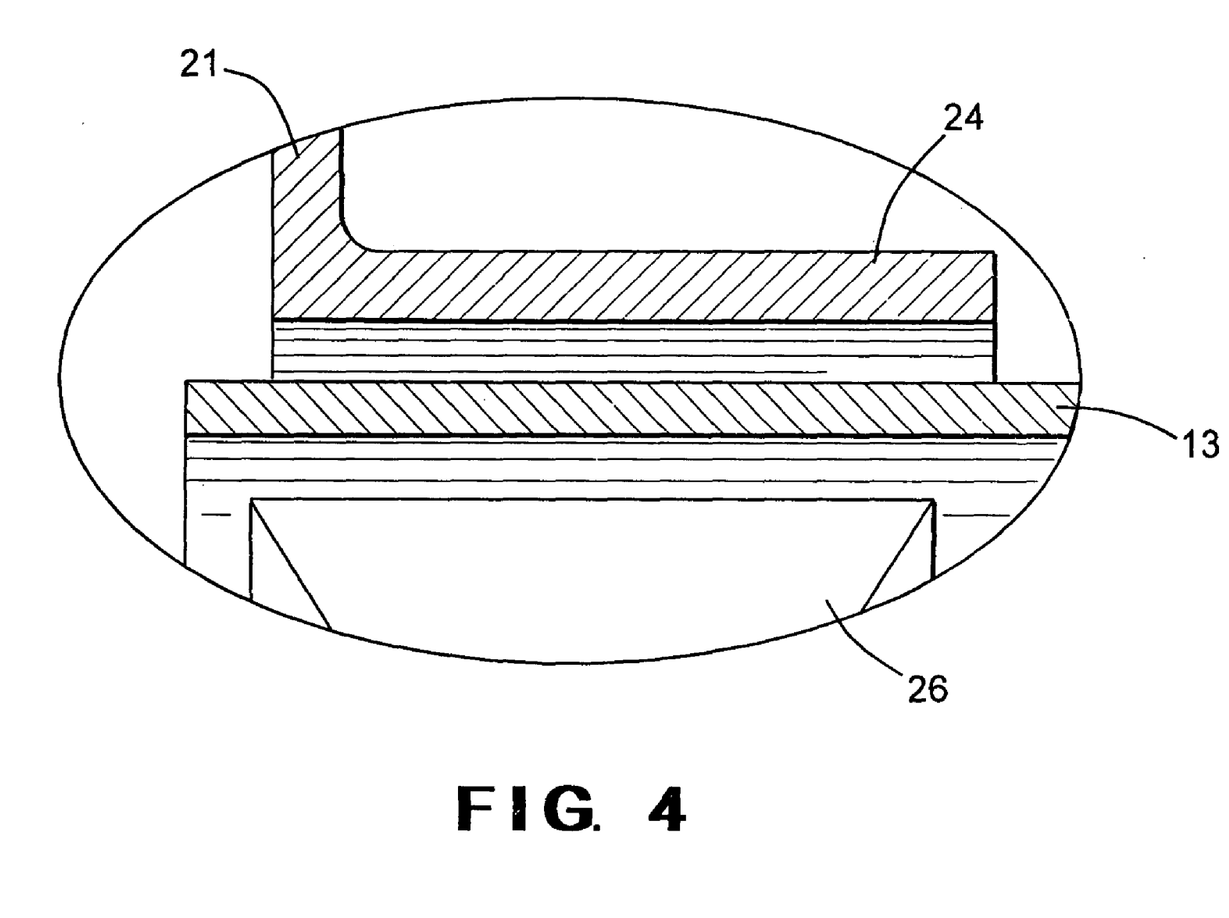
FIG. 4 is an enlarged sectional elevational view similar to FIG. 3 showing the portions of one of the side rails and one of the cross members after the inductor has been partially energized to align the two components prior to securement.

The electromagnetic coil 26 is then partially energized so as to generate a magnetic field of relatively small intensity within the end of the cross member 13 and the mounting projection 24 of the side rail 11. This can be accomplished by causing an electrical current of relatively small magnitude to be passed through the leads 26a and 26b of the coil 26. This relatively small intensity magnetic field exerts a relatively small force on the two components, causing them to move to a co-axially aligned position relative to one another and to the coil 26, as shown in FIG. 4.

Figure 5:
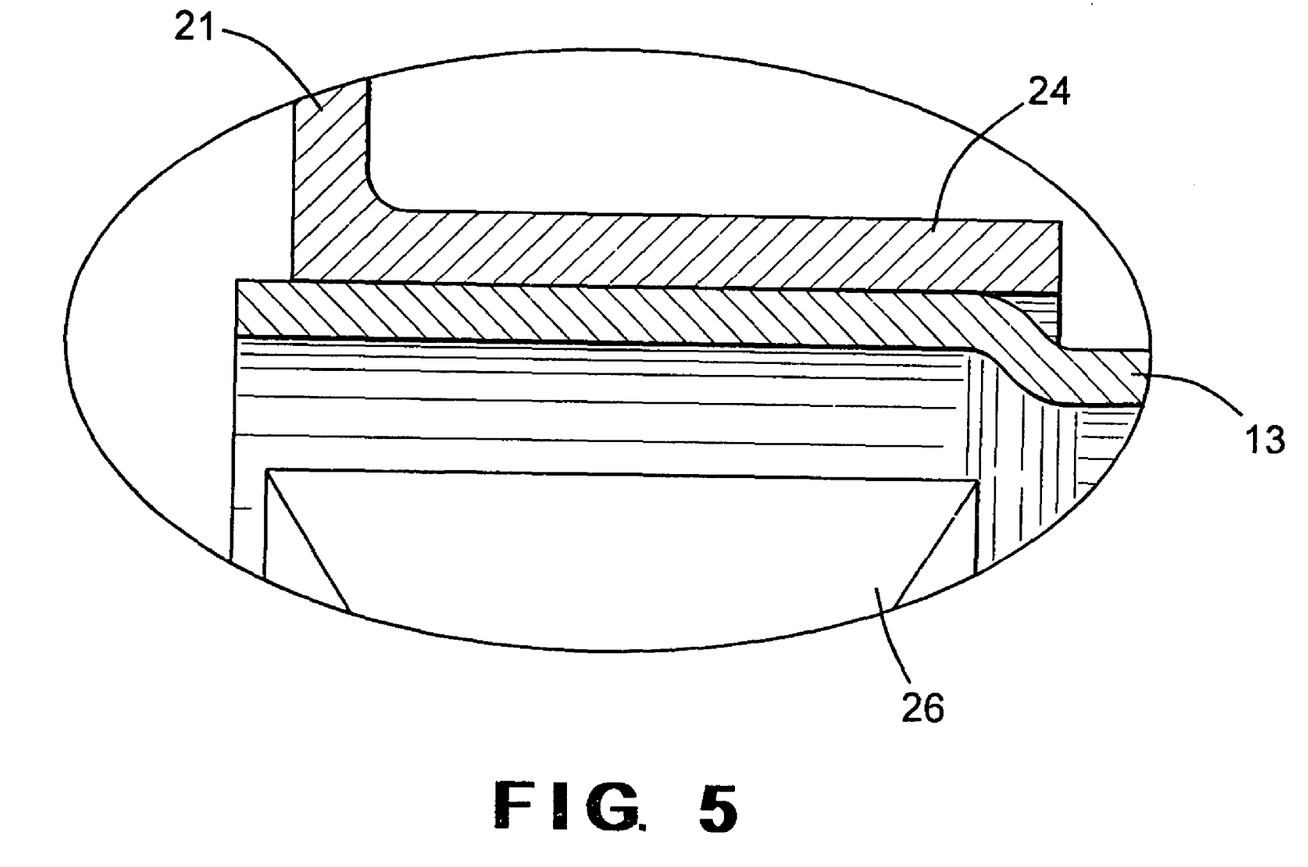
FIG. 5 is an enlarged sectional elevational view similar to FIG. 4 showing the portions of one of the side rails and one of the cross members after the inductor has been fully energized to secure the two components together.

Then, while the end of the cross member 13 and the mounting projection 24 of the side rail 11 are co-axially aligned, the two components are next subjected to a magnetic field of relatively large intensity for the purpose of permanently joining such components together. This can be accomplished by causing an electrical current of relatively large magnitude to be passed through the leads 26a and 26b of the coil 26. This relatively large intensity magnetic field exerts a large pressure on the end of the cross member 13, causing it to expand outwardly toward the mounting projection 24 of the side rail 11 at a high velocity. The high velocity impact of these two components, as well as the large pressures exerted thereon, caused the two components to become permanently joined together, as shown in FIG. 5.

If desired, the preliminary low intensity magnetic field can also be used to preliminarily heat the two components in the nature of induction heating. This can be accomplished by maintaining the preliminary low intensity magnetic field for a predetermined period of time beyond that which is necessary to effect the co-axial alignment of the components. Such preliminary heating of the two components can soften them somewhat in order to facilitate the subsequent performance of the magnetic pulse welding operation. As a result of such softening, the amount of energy that is consumed during the magnetic pulse welding operation may be reduced.

Figure 6:
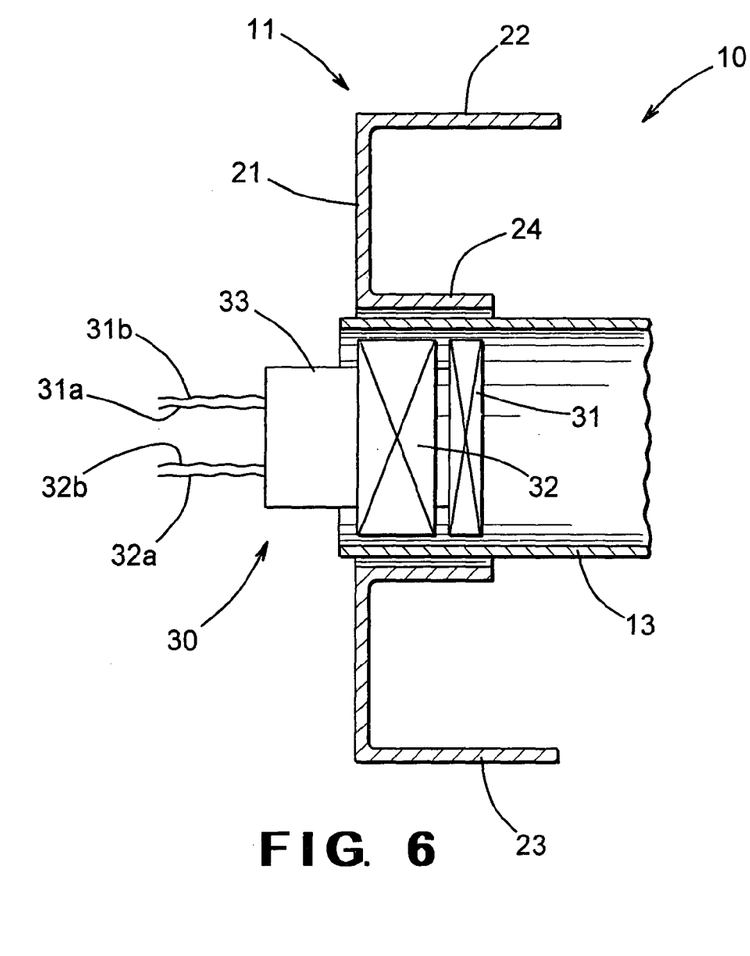
FIG. 6 is a side elevational view similar to FIG. 2 showing a first alternative embodiment for the inductor.

FIG. 6 illustrates a first alternative embodiment for the magnetic pulse welding inductor assembly, indicated generally at 30. The modified magnetic pulse welding inductor assembly 30 includes first and second electromagnetic coils 31 and 32 that are carried on a movable support 33 and can be disposed within the end of the cross member 13. The first coil 31 is composed of a winding of an electrical conductor having leads 31a and 31b that extend therefrom through a switch (not shown) to a source of electrical power (not shown). Similarly, the second coil 32 is composed of a winding of an electrical conductor having leads 32a and 32b that extend therefrom through a switch (not shown) to a source of electrical power (not shown). The first coil 31 can be energized in the manner described above to generate the magnetic field of relatively small intensity, while the second coil 32 can be energized in the manner described above to generate the magnetic field of relatively large intensity.

Figure 7:
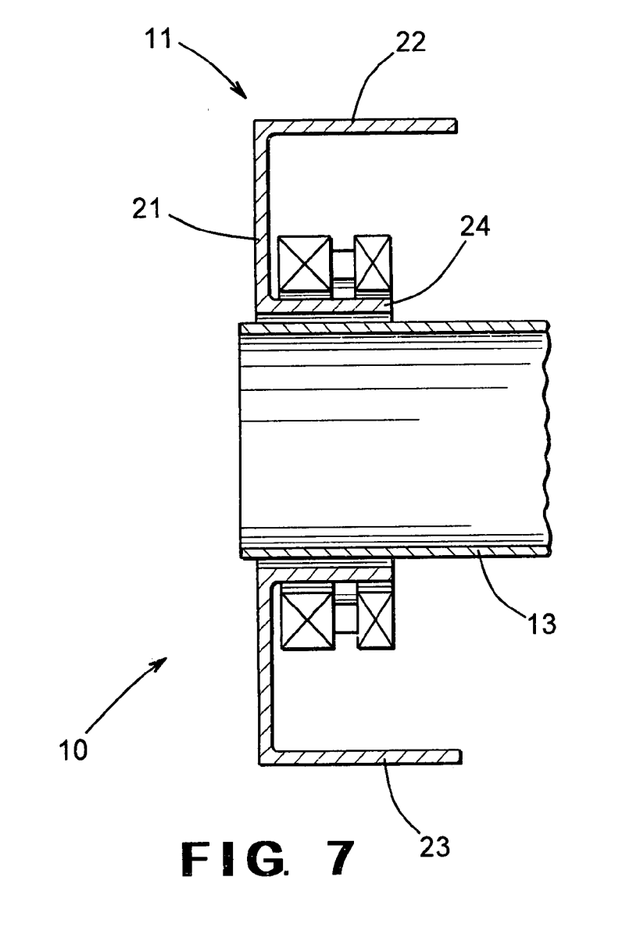
FIG. 7 is a side elevational view similar to FIG. 2 showing a second alternative embodiment for the inductor.

FIG. 7 illustrates a second alternative embodiment for the magnetic pulse welding inductor assembly, indicated generally at 40. The modified magnetic pulse welding inductor assembly 40 includes first and second electromagnetic coils 41 and 42 that are carried on a movable support (not shown) and can be disposed about the mounting projection 24 of the side rail. The first coil 41 is composed of a winding of an electrical conductor having leads (not shown) that extend therefrom through a switch (not shown) to a source of electrical power (not shown). Similarly, the second coil 42 is composed of a winding of an electrical conductor having leads (not shown) that extend therefrom through a switch (not shown) to a source of electrical power (not shown). The first coil 41 can be energized in the manner described above to generate the magnetic field of relatively small intensity, while the second coil 42 can be energized in the manner described above to generate the magnetic field of relatively large intensity. With the external magnetic pulse welding inductor assembly 40, however, the relatively large intensity magnetic field exerts a large pressure on the mounting projection 24 of the side rail 11, causing it to collapse inwardly toward the end of the cross member 13 at a high velocity. The high velocity impact of these two components, as well as the large pressures exerted thereon, caused the two components to become permanently joined together.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A method of performing a magnetic pulse welding operation comprising the steps of:
   (a) providing first and second components in an axially overlapping, spaced apart relationship;
   (b) generating a magnetic field of relatively small intensity so as to cause the first and second components to move to a co-axially aligned and spaced apart position relative to one another; and
   (c) generating a magnetic field of relatively large intensity so as to cause the first and second components to become permanently joined together.

2. The method defined in claim 1 wherein said step (a) is performed by providing first and second hollow components.

3. The method defined in claim 1 wherein said step (b) is performed by providing an inductor within the first and second components and by partially energizing the inductor.

4. The method defined in claim 3 wherein said step (c) is performed by fully energizing the inductor after the first and second components have been moved to a co-axially aligned position relative to one another.

5. The method defined in claim 1 wherein said step (b) is performed by providing an inductor about the first and second components and by partially energizing the inductor.

6. The method defined in claim 5 wherein said step (c) is performed by fully energizing the inductor after the first and second components have been moved to a co-axially aligned position relative to one another.

7. The method defined in claim 1 wherein said step (b) is performed by providing first and second inductors within the first and second components and by energizing the first inductor.

8. The method defined in claim 7 wherein said step (c) is performed by energizing the second inductor after the first and second components have been moved to a co-axially aligned position relative to one another.

9. The method defined in claim 1 wherein said step (b) is performed by providing first and second inductors about the first and second components and by energizing the first inductor.

10. The method defined in claim 9 wherein said step (c) is performed by energizing the second inductor after the first and second components have been moved to a co-axially aligned position relative to one another.

11. An apparatus for performing a magnetic pulse welding operation comprising:

a mechanism for supporting first and second components in an axially overlapping, spaced apart relationship; and an inductor that initially generates a magnetic field of relatively small intensity so as to cause the first and second components to move to a co-axially aligned and spaced apart position relative to one another and subsequently generates a magnetic field of relatively large intensity so as to cause the first and second components to become permanently joined together.

12. The apparatus defined in claim 11 wherein said inductor is adapted to be disposed within the first and second components.

13. The apparatus defined in claim 11 wherein said inductor is adapted to be disposed about the first and second components.

14. The apparatus defined in claim 11 wherein said inductor includes a first inductor that initially generates the magnetic field of relatively small intensity and a second inductor that generates the magnetic field of relatively large intensity.

15. The apparatus defined in claim 11 wherein said first and second inductors are adapted to be disposed within the first and second components.

16. The apparatus defined in claim 11 wherein said first and second inductors are adapted to be disposed about the first and second components.

17. A method of performing a magnetic pulse welding operation comprising the steps of:
(a) providing first and second components in an axially overlapping relationship;
(b) generating a magnetic field of relatively small intensity so as to cause the first and second components to move to a co-axially aligned position relative to one another without deformation of the first and second components; and
(c) generating a magnetic field of relatively large intensity so as to cause the first and second components to become permanently joined together.

18. The method defined in claim 17 wherein said step (a) is performed by providing first and second hollow components.

19. The method defined in claim 17 wherein said step (b) is performed by providing an inductor within the first and second components and by partially energizing the inductor.

20. The method defined in claim 19 wherein said step (c) is performed by fully energizing the inductor after the first and second components have been moved to a co-axially aligned position relative to one another.

21. The method defined in claim 17 wherein said step (b) is performed by providing an inductor about the first and second components and by partially energizing the inductor.

22. The method defined in claim 21 wherein said step (c) is performed by fully energizing the inductor after the first and second components have been moved to a co-axially aligned position relative to one another.

23. The method defined in claim 17 wherein said step (b) is performed by providing first and second inductors within the first and second components and by energizing the first inductor.

24. The method defined in claim 23 wherein said step (c) is performed by energizing the second inductor after the first and second components have been moved to a co-axially aligned position relative to one another.

25. The method defined in claim 17 wherein said step (b) is performed by providing first and second inductors about the first and second components and by energizing the first inductor.

26. The method defined in claim 25 wherein said step (c) is performed by energizing the second inductor after the first and second components have been moved to a co-axially aligned position relative to one another.

27. An apparatus for performing a magnetic pulse welding operation comprising:
a mechanism for supporting first and second components in an axially overlapping relationship; and an inductor that initially generates a magnetic field of relatively small intensity so as to cause the first and second components to move to a co-axially aligned position relative to one another without deformation of the first and second components and subsequently generates a magnetic field of relatively large intensity so as to cause the first and second components to become permanently joined together.

28. The apparatus defined in claim 27 wherein said inductor is adapted to be disposed within the first and second components.

29. The apparatus defined in claim 27 wherein said inductor is adapted to be disposed about the first and second components.

30. The apparatus defined in claim 27 wherein said inductor includes a first inductor that initially generates the magnetic field of relatively small intensity and a second inductor that generates the magnetic field of relatively large intensity.

31. The apparatus defined in claim 27 wherein said first and second inductors are adapted to be disposed within the first and second components.

32. The apparatus defined in claim 27 wherein said first and second inductors are adapted to be disposed about the first and second components.

* * * * *